(12) United States Patent
Kang

(10) Patent No.: US 8,407,279 B2
(45) Date of Patent: Mar. 26, 2013

(54) PORTABLE TERMINAL AND METHOD FOR PROVIDING SOCIAL NETWORK SERVICE USING HUMAN BODY COMMUNICATION

(75) Inventor: Min Su Kang, Euiwang-si (KR)

(73) Assignee: Pantech Co., Ltd., Seoul (KR)

( * ) Notice: Subject to any disclaimer, the term of this patent is extended or adjusted under 35 U.S.C. 154(b) by 128 days.

(21) Appl. No.: 13/019,129

(22) Filed: Feb. 1, 2011

(65) Prior Publication Data

US 2012/0023169 A1 Jan. 26, 2012

(30) Foreign Application Priority Data

Jul. 26, 2010 (KR) .................. 10-2010-0071759

(51) Int. Cl.
*G06F 15/16* (2006.01)
(52) U.S. Cl. ........ 709/202; 709/205; 709/224; 709/225; 709/228
(58) Field of Classification Search .................. None
See application file for complete search history.

(56) References Cited

U.S. PATENT DOCUMENTS

| | | | | |
|---|---|---|---|---|
| 2009/0298447 A1* | 12/2009 | Kim et al. | ......... | 455/127.1 |
| 2011/0019717 A1* | 1/2011 | Lim et al. | ......... | 375/132 |
| 2011/0169932 A1* | 7/2011 | Mula et al. | ......... | 348/77 |
| 2011/0175879 A1* | 7/2011 | Tanaka | ......... | 345/211 |
| 2012/0170482 A1* | 7/2012 | Hwang et al. | ......... | 370/252 |

FOREIGN PATENT DOCUMENTS

| | | |
|---|---|---|
| JP | 2008-196217 | 8/2008 |
| JP | 2009-164740 | 7/2009 |
| JP | 2009-200638 | 9/2009 |
| KR | 10-2009-0113524 | 11/2009 |
| KR | 10-2009-0128305 | 12/2009 |

* cited by examiner

*Primary Examiner* — Kenny Lin
*Assistant Examiner* — Joe Combs
(74) *Attorney, Agent, or Firm* — H.C. Park & Associates, PLC

(57) ABSTRACT

A portable terminal to provide social network service using human body communication includes a human body communication unit to transmit or receive data through a human body, a memory unit to store at least one of social data, user data, reference data, and any additional data collected, a contact object identifying unit to identify a contact object by using the data received by the human body communication unit, and a pattern analyzing unit to analyze a pattern of contact with the contact object using the data stored in the memory unit. A method for providing social network service using human body communication includes sensing a human body contact, identifying a contact object, and analyzing a pattern of contact with the contact object using at least one of social data, user data, reference data and any additional data collected.

28 Claims, 4 Drawing Sheets

PORTABLE TERMINAL AND METHOD FOR PROVIDING SOCIAL NETWORK SERVICE USING HUMAN BODY COMMUNICATION

CROSS-REFERENCE TO RELATED APPLICATION

This application claims priority from and the benefit under 35 U.S.C. §119(a) of Korean Patent Application No. 10-2010-0071759, filed on Jul. 26, 2010, which is hereby incorporated by reference for all purposes as if fully set forth herein.

BACKGROUND

1. Field

The following description relates to a portable terminal and a method for providing a social network service using a human body communication, and more particularly, to a portable terminal and a method for providing a social network service using a human body communication.

2. Discussion of the Background

A social network service or a social community service is a service that focuses on building and maintaining relationships between a user and other persons in a communication environment.

In the communication industry, signal transmission technologies for transmitting various data between portable terminals include a human body communication technology. The human body communication technology uses the human body as a transmission medium, similar to an electrical wire, to communicate data. This technology relies on the conductor properties of a human body, which allows weak electric current to flow and electrical signals to be transmittable using the human body. In an example, if a voltage is applied to a human body contacted with a transmitter or receiver, an electric field of the surface of the human body changes, and the transmitter or receiver amplifies a small difference in the electric field and allows the electrical signals to be transmitted or received. The current flowing into the human body may be approximately 500 µA, which may be equal to a level of an electric current used in a body fat scale, and harmless to the human body.

Accordingly, using an electric current running through a human body as a transmission medium, similar to an electrical wire, the human body communication may enable transmission of various data, such as a picture, a moving image, a sound source, and the like, by making contact with a finger or shaking hands without a need for an Internet network, while reducing power consumption.

SUMMARY

Exemplary embodiments of the present invention provide a portable terminal to provide social network service using human body communication and a method for providing a social network service using a human body communication.

Additional features of the invention will be set forth in the description which follows, and in part will be apparent from the description, or may be learned by practice of the invention.

Exemplary embodiments of the present invention provide a portable terminal to provide a social network service using human body communication including a human body communication connection analyzing unit to sense a human body contact; a human body communication unit to transmit or receive data through a human body; a memory unit to store at least one of social data, user data, reference data, and additional data collected; a contact object identifying unit to identify a contact object by using the data received by the human body communication unit; and a pattern analyzing unit to analyze a pattern of contact with the contact object using the data stored in the memory unit.

Exemplary embodiments of the present invention provide a method for providing a social network service using human body communication including sensing a human body contact; transmitting or receiving data through a human body communication; storing at least one of social data, user data, reference data, and additional data collected; identifying a contact object using the data received via the human body communication; and analyzing a pattern of contact with the contact object using at the stored data.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
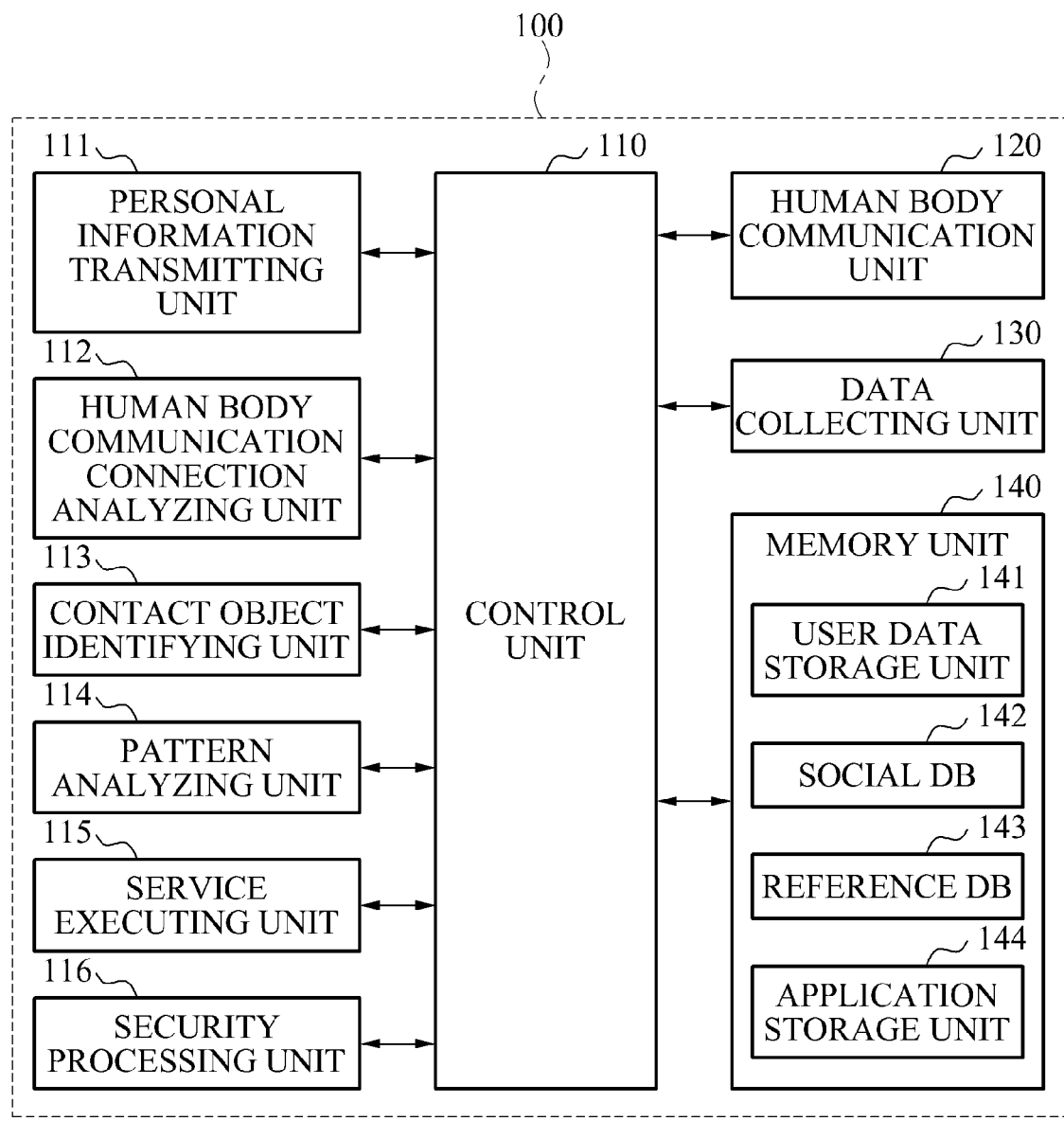
FIG. 1 is a block diagram illustrating a structure of a portable terminal to provide social network service using a human body communication according to an exemplary embodiment of the invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Throughout the drawings and the detailed description, unless otherwise described, the same drawing reference numerals are understood to refer to the same elements, features, and structures. The relative size and depiction of these elements may be exaggerated for clarity, illustration, and convenience.

For the purposes of this disclosure, "at least one of each" will be interpreted to mean any combination the enumerated elements following the respective language, including combination of multiples of the enumerated elements. For example, "at least one of X, Y, and Z" will be construed to mean any combination of items X, Y, and Z, including only X, only Y, or only Z, (e.g. XYZ, XZ, YZ, X), including multiples of X's, Y's, or Z's (e.g. 2X, 3Y, 1Z).

FIG. 1 is a block diagram illustrating a structure of a portable terminal to provide social network service using a human body communication according to an exemplary embodiment of the invention.

As shown in FIG. 1, the portable terminal 100 includes a control unit 110, a s personal information transmitting unit 111, a human body communication connection analyzing unit 112, a contact object identifying unit 113, a pattern analyzing unit 114, a service executing unit 115, a security processing unit 116, a human body communication unit 120, a data collecting unit 130, a memory unit 140, a user data storage unit 141, a social database (DB) 142, a reference DB 143, and an application storage unit 144.

The human body communication unit 120 transmits data, including identity information of the portable terminal 100, and receives data, including identity information of a target portable terminal through a human body contact. The human body communication unit 120 may modulate the identity information and data of the portable terminal 100 and transmit a transmitting current including the modulated data through the human body. The human body communication unit 120 may remove noise from a signal received through the human body and amplify the signal. Also, the human body communication unit 120 may demodulate the received signal to receive identity information and data of a target portable terminal for contact.

The data collecting unit 130 collects additional data to be used for a social network service. In an example, the additional data may include human body contact occurrence location information, human body contact occurrence time information, weather information, human body contact occurrence area information, and the like. This additional data may be stored in the reference DB 143. Further, the human body contact occurrence area information may be collected using a skinput technology, the human body contact occurrence location information may be collected using a global positioning system (GPS), and the human body contact occurrence time information may be confirmed using an embedded watch or based on a satellite time.

The memory unit 140 stores various data for a social network service, and includes the user data storage unit 141, the social DB 142, the reference DB 143, and the application storage unit 144. The stored data in each DB may be stored in an internal memory or an external memory of portable terminals. Further, the stored data in each DB may be stored or backed up in a network server at a predetermined cycle or at a start or an end of the social network service.

The user data storage unit 141 stores user's data. In an example, user's data may include a telephone directory, message data, a picture, a moving image, schedule information of the user, and the like.

The social DB 142 stores social data of the contact object that is generated by the pattern analyzing unit 114. In an example, social data may include identification information of a contact object, name of a contact object, password to secure social data, social network information, and social relationship information. An exemplary data structure of the social data is explained more in detail in FIG. 2.

The reference DB 143 stores reference data used to analyze a contact pattern for setting a relationship with the contact object. In an example, the reference data may include human body contact occurrence location information, human body contact occurrence time information, weather information, human body contact occurrence area information, and the like. The enumerated reference data may be collected by the information collecting unit 130 or provided by another source, for example short message service (SMS), multimedia message service (MMS), infrared data transfer, or another method of data transmission between terminals.

The application storage unit 144 stores an application that may be executed by the service executing unit 115 based on a relationship mode and a relationship level determined by the pattern analyzing unit 114. The application stored in the application storage unit 144 may include a business card exchange application, a scheduling application, an information sharing application, a ticket transmitting application, agent service application, and the like.

The business card exchange application may be an application for exchanging business cards. In an example, the business card exchange application may be executed when a contact area is a hand, and the relationship mode is set as a business mode.

The scheduling application may be an application for sharing a schedule or for automatically setting a task to unoccupied time. In an example, the scheduling application may be executed when the relationship mode is set as 'friend' or 'lover,' and the relationship level is equal to or higher than a predetermined threshold level.

The information sharing application may be an application for sharing stored data, such as, a picture, a moving image, text, and the like. In an example, the information sharing application may be executed when the relationship mode is set as 'friend' or 'lover,' and the relationship level is equal to or higher than a predetermined threshold level. Further, information to be shared may be classified into different grades, and the degree of information sharing according to grade may vary depending on the set relationship level.

In addition, the information sharing application may also provide an information sharing service by using a predetermined gesture or movement via a human body contact. If a human body contact is sensed, a portable terminal may establish a wireless communication connection using a human body communication, add a predetermined gesture or movement, and enable automatic sharing of the current information or other information using a registered activity or gesture in a discrete situation or an unspecified place. In an example, predetermined gesture may include hi-five of hands, slapping of the hip, laying a hand on a shoulder, clasping hands, and the like.

The ticket transmitting application may be an application for transmitting or receiving a purchased ticket. In an example, the ticket transmitting application may be executed if the contact area is a predetermined area and a relationship mode of the contact object is set at a predetermined mode. In addition, the ticket transmitting application may provide a ticket transmitting service using a predetermined contact pattern. For example, if a user purchases tickets of a movie or a sports game for a group of people using a portable terminal, the portable terminal of the purchaser may designate a predetermined contact pattern to transmit the stored ticket using the predetermined contact pattern. Accordingly, if the portable terminal senses a predetermined contact pattern, the portable terminal may transmit the ticket to a contact object. In an example, the predetermined contact pattern may include contact of a predetermined human body area, such as, hi-five of hands, slapping of the hip, laying a hand on a shoulder, clasping hands, and the like. Also, the predetermined contact pattern may include a continuous contact of a predetermined human body area, such as, a continuous contact of a shoulder, a left hand and a right hand, and the like.

An agent service application provides an agent service for dealing with matters on behalf of a specific person. In an example, the agent service may be a service which allows an authorized agent to act for the specified person to deal with matters related to public business or matters requiring personal identification. A portable terminal of the agent may be authorized using a human body contact of the authorizing party and parties requiring verification may certify an agent by displaying authorization on the portable terminal of the agent if human body contact with the authorized agent is made. In an example, authorization may be secured using a password, information of which a time limit is set, and the like.

The personal information transmitting unit 111 controls the human body communication unit 120 to transmit identity information of the portable terminal 100. In an example, the personal information transmitting unit 111 may transmit identity information at a predetermined time interval, or when the human body communication connection analyzing unit 112 senses a meaningful human body contact has occurred. Accordingly, if the human body communication connection analyzing unit 112 determines the sensed human body contact is not a meaningful contact, then the identity information of the portable terminal 100 is not transmitted. Determination as to whether the human body contact was meaningful or not may be determined by the human body communication connection analyzing unit 112.

The human body communication connection analyzing unit 112 senses and analyzes the duration of contact time of the contact object to determine whether the contact was a meaningful contact. If a human body contact is made, the human body communication analyzing unit 112 identifies the area of the human body contact and begins measuring the duration of the contact and the placement of the contact. If the retention time of the human body contact is equal to or greater than a predetermined time, then the contact is determined to be meaningful. Alternatively, if the placement of the human body contact is at one of the predetermined areas, then the contact may be determined to be meaningful. The area of the human body contact may be identified using a skinput technology or other equivalent technologies. Accordingly, if the retention time of the human body contact is less than the predetermined value and the placement of the human body contact is not of a predetermined area, then the contact may not be a meaningful contact.

The contact object identifying unit 113 identifies the contact object using identity information of the target contact object received by the human body communication unit 120. The contact object identifying unit 113 receives identity information of the contact object if the human body contact is determined to be a meaningful contact by the human body communication analyzing unit 112.

The pattern analyzing unit 114 analyzes a pattern of contact with the contact object using data provided in the user data storage data 141, social data stored in the social DB 142, reference data stored in the reference DB 143, and additional data collected by the data collecting unit 130, together with human body contact information analyzed by the human body communication connection analyzing unit 112.

The pattern analyzing unit 114 sets a relationship mode of the contact object using the contact object information stored in at least one of reference DB 143, user data storage unit 141, and additional data collected by the data collecting unit 130. For example, if a human body contact occurrence time belongs to a business group in the user schedule information of the portable terminal or if the contact object is introduced for the first time, the portable terminal may determine the current contact as a business contact. Accordingly, the portable terminal may set the relationship mode as a 'business mode.' Similarly, if data exists in a telephone directory along with other personal information or if number of contact is set at a high frequency, the portable terminal may set the relationship mode as a 'friend mode."

The pattern analyzing unit 114 also sets a relationship level of the contact object using at least one of a contact frequency, a contact time, and a contact area of the contact object. For example, if contact frequency is set as '1' to indicate first meeting, relationship level may be set at the lowest level, such as 'level 1.' Similarly, extended contact time, and more intimate area the area of contact may cause the relationship level to be set at a higher level. Accordingly, more contact frequency, greater contact time, or higher importance of contact area, may cause a higher relationship level to be set.

In an example, if a human body contact is sensed and contact object information exists during business hours in a scheduling application of the portable terminal, the portable terminal may determine the current contact object as a business contact. Accordingly, the portable terminal may set a relationship level as 'level 1' and enable exchange of information related to official business, such as a business card. In addition, the portable terminal may set a contact frequency as '1'. If a contact with the same person occurs again at a time when a business schedule does not exist, the portable terminal may additionally set a 'private mode' as well as a 'business mode,' and set a relationship level for the private relationship.

In another example, if a contact with a human body is sensed in a multilateral conference or meeting, multiple contact objects may be sensed. Accordingly, the portable terminal may recognize at least two contact objects and check where the identity information of each contact object is allocated in a social database of the portable terminal. Because the identity information the contact objects may be two or more, the portable terminal may determine the identified contact objects as a multiple contact and execute an application related to the multilateral conference or meeting.

The pattern analyzing unit 114 searches for the contact object in the social DB 142 to determine whether the contact object is a new contact object or a previously stored contact object.

In an example, if the contact object is determined to be a new contact object, no data may be found in the social DB 142. Accordingly, the pattern analyzing unit 114 may analyze a contact pattern using data provided in the user data storage unit 141, reference data stored in the reference DB 143 or the additional data collected by the data collecting unit 130. Based on the analysis, the pattern analyzing unit 114 may determine a relationship mode and a relationship level of the contact object, and store social data including the determined relationship mode and relationship level in the social DB 142. In an example, if the contact object is a new contact object and is classified as a customer in a telephone directory or if a human body contact occurrence time belongs to a business group in the user schedule information, the pattern analyzing unit 114 may set a relationship mode as a 'business mode,' and set a relationship level at the lowest level of 'level 1'.

In an example, if a human body contact is sensed, such as, shaking hands when meeting a new person for the first time, the portable terminal may recognize the contact object as a new contact object and merely update and share identity information but may not share intimate data.

In another example, the pattern analyzing unit 114 may also recognize the relationship with a contact object as a 'friend mode' if the portable terminal stores more intimate personal information in its database, even if the contact is a first contact with the contact object. Accordingly, if a contact with a close friend is sensed but the contact with the close friend is a new contact, the portable terminal may determine a relationship of the new contact object using stored data such as a telephone directory and the like. If there sufficient personal data associated with the new contact object, a relationship mode may be set as a 'friend mode.' If the portable terminal senses a subsequent contact with the new contact object, the portable terminal may increase a contact counter and collect additional data during contact. Also, the portable terminal may provide a service for generating and managing a commemorative photo album using the additionally collected data, such as, a date, a time, a place, a picture, and the like.

In another example, if a contact with a lover is sensed, a portable terminal may collect additional data to provide a commemorative photo album service using the additionally collected data, such as, a date, a time, a place, a picture, and the like. Also, the portable terminal may store detailed information to give meaning for each human body contact area, such as, a date, a time, a place, a picture, and the like, along with the human body contact area information.

On the other hand, if the contact object is a previously contacted object retrieved in the social DB 142, the pattern analyzing unit 114 analyzes a contact pattern using data provided in the user data storage unit 141, social data stored in the social DB 142, reference data stored in the reference DB 143 and additional data collected by the data collecting unit 130. Based on the result of that analysis, the pattern analyzing unit 114 updates the social data of the contact object stored in the social DB 142. In an example, if the contact object is a previously contacted object, and the relationship mode of the contact object is set as a friend mode and the relationship level is set as 'level 2' in the social DB 142, the pattern analyzing unit 114 may analyze the contact pattern again to check whether there is a change in the relationship mode or the relationship level. If there are changes to the relationship mode or the relationship level, the corresponding social data is updated with the changed information.

The service executing unit 115 determines the application to be executed in the application storage unit 144 based on the relationship mode and relationship level determined by the pattern analyzing unit 114, and executes the application. In this instance, the service executing unit 115 may determine an application using data for storage in the user data storage unit 141, social data stored in the social DB 142, reference data stored in the reference DB 143 and additional data collected by the data collecting unit 130. In an example, if the relationship mode is determined as a 'business mode,' and relationship level is set at 'level 1,' the service executing unit 115 in response may execute business related applications, such as a business card exchange application. The application to be executed may include a business card exchange application, a scheduling application, an information sharing application, a ticket transmitting application, or the like.

The security processing unit 116 protects the social data generated by the pattern analyzing unit 114 according to provided threshold settings.

In an example, the security processing unit 116 may provide data protection by hierarchically providing a service by the service executing unit 115 based on the relationship mode and the relationship level as determined by the pattern analyzing unit 114.

Further, in an example, the security processing unit 116 may protect social data by setting threshold requirements to use security of social data. Threshold requirements may be set by designating a security level and securing social data based on the security level, by assigning a category to social data and securing the social data for each category, or by setting a password and authenticating using the password, based on settings of a user.

The social network service according to an exemplary embodiment of the invention may be provided using a human body communication between opposing-side devices. When the opposing-side devices are replaced, the existing relationship between the opposing-side devices may be retained. Accordingly, social data may be managed and stored to facilitate retention of relationships even when the devices storing the existing relationships are replaced. The social data may be stored in an internal memory or an external memory of portable terminals. Also, the social data may be stored in a network server at a predetermined cycle or at a start or an end of the social network service.

To facilitate the retention of existing relationship data prior to replacement of the opposing-side devices, the social data stored in an internal memory or an external memory of the portable terminals may be moved or copied. The existing relationship may be retained through movement, copying and deletion of the social data between the portable terminals using any communication technologies including a human body communication, Bluetooth communication, Wi-Fi communication, an infrared communication, and the like.

Even when devices are to be changed, an existing relationship may be retained by storing social data in a network server. Accordingly, the existing relationship may be retained by receiving social data stored in the portable terminal so that they may be stored in the network server. In an example, an authentication process may be performed using identity information and a password of a user, and the like when receiving or retrieving social data from the network server.

The control unit 110 controls the personal information transmitting unit 111, the human body communication connection analyzing unit 112, the contact object identifying unit 113, the pattern analyzing unit 114, the service executing unit 115 and the security processing unit 116. That is, the control unit 110 may perform functions of the personal information transmitting unit 111, the human body communication connection analyzing unit 112, the contact object identifying unit 113, the pattern analyzing unit 114, the service executing unit 115 and the security processing unit 116. Although the present embodiment describes each function of the above units individually, the control unit 110 may perform the functions of these units such that a control unit according to an exemplary embodiment includes these separately-described units. Alternatively, the control unit 110 may perform only a portion of the functions of the enumerated components, and the remaining portion of the functions may be performed by one or more other components of a portable terminal.

Figure 2:
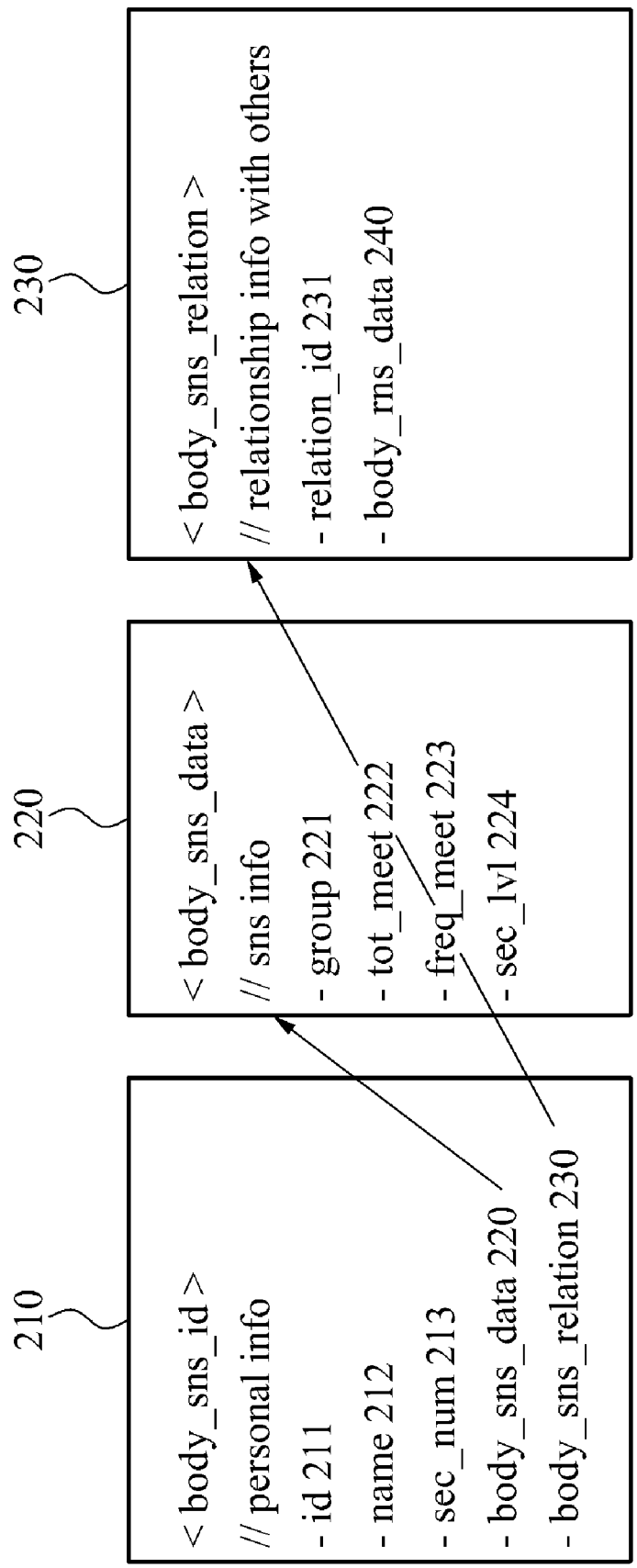
FIG. 2 is a block diagram illustrating a structure of social data in a social network according to an exemplary embodiment of the invention.

FIG. 2 is a block diagram illustrating a structure of social data in a social network according to an exemplary embodiment of the invention.

As shown in FIG. 2, social data (body_sns_id) 210 includes identity information (id) 211, a name (name) 212, a password (sec_num) 213, social network information (body_sns_data) 220, and social relationship information (body_sns_relation) 230.

In an example, the identity information (id) 211 may be information for identifying the contact object. The name (name) 212 may be a name of the contact object. The password (sec_num) 213 may be used to secure the social data 210.

The social network information (body_sns_data) 220 may be information for a social network service, which includes a relationship mode (group) 221, a contact time (tot_meet) 222, a contact frequency (freq_meet) 223, and a relationship level (sec_lvl) 224 of the contact object. In an example, the relationship mode (group) 221 may be information indicating a relationship with the contact object, such as, a family group, a friend group, a love group, a business group, and the like. The contact time (tot_meet) 222 may be information of the total time of contact that was spent with the contact object. The contact frequency (freq_meet) 223 may be information of the total number of contacts with the contact object. The relationship level (sec_lvl) 224 may be information indicating a level of a relationship with the contact object.

The social relationship information (body_sns_relation) 230 may be information of a third party having a relationship with the contact object, which includes relationship identity information (relation_id) 231, and relationship network information (body_rns_data) 240. In an example, the relationship identity information (relation_id) 231 may be identity information of another user having a relationship with the contact object, and the relationship network information (body_rns_data) 240 may be information about a relationship between the contact object and another user. The relationship network information (body_rns_data) 240 may have a similar structure as the social network information (body_sns_data) 220. More specifically, relationship network information (body_rns_data) 240 may include a relationship mode indicating a relationship between the contact object and the third party, a relationship level indicating a level of relationship between the contact object and the third party, a contact time indicating the retention time of contact between the contact object and the third party, and a contact frequency indicating the number of contacts between the contact object and the third party over life of the relationship or according to a limited time of the relationship.

Figure 3:
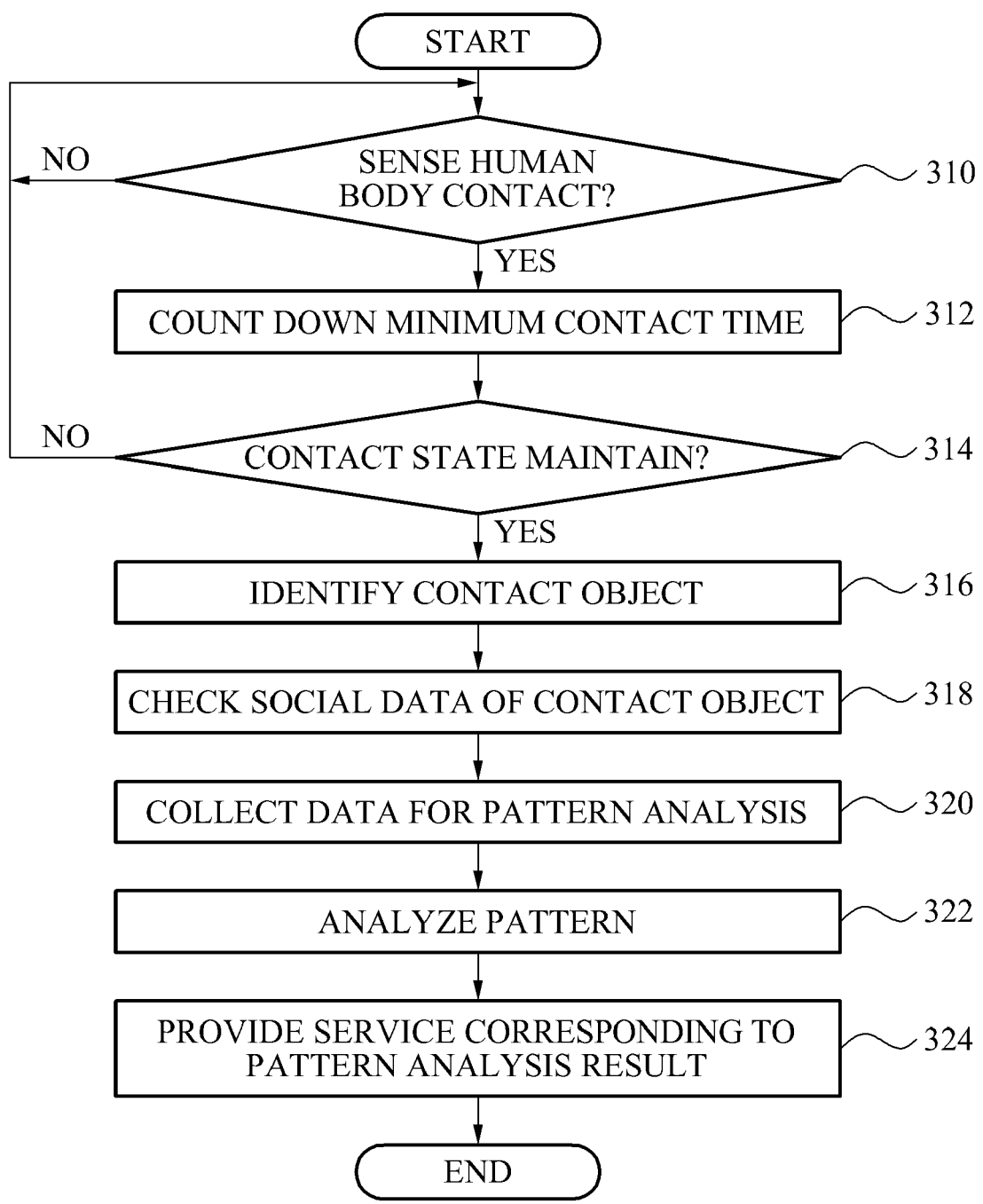
FIG. 3 is a flowchart illustrating a method for providing a social network service using a human body communication according to an exemplary embodiment of the invention.

FIG. 3 is a flow chart illustrating a method for providing a social network service using a human body communication according to an exemplary embodiment of the invention. For convenience, FIG. 3 will be described as if the method were performed by portable terminal 100 described above. However, the method is not limited as such.

As shown in FIG. 3, if the portable terminal 100 senses a human body contact in operation 310, the portable terminal 100 begins counting the time of contact to check whether the contact is maintained for a minimum contact time. In an example, the minimum contact time may be set by the user, portable terminal, or by some other entity.

In operation 314, the portable terminal 100 may check whether the contact was maintained for the minimum contact time.

If the contact ends before the minimum contact time in operation 314, the portable terminal 100 determines the contact as a meaningless contact and returns to operation 310.

Alternatively, if the contact is maintained for the minimum contact time in operation 314, the portable terminal 100 determines the contact as a meaningful contact, and receives identity information of the contact object in operation 316.

In operation 318, a check is performed to verify if social data of the contact object exists. The social data may be found in the social DB 142, a remote server storing such information, an external memory, or any other electronic storing devices.

If social data for the contact object does not exist, the contact object may be a new contact object. Accordingly, the pattern analyzing unit 114 may analyze a pattern of contact with the contact object using the data stored in the memory unit 140, determine a relationship mode and relationship level of the contact object, and generate a new social data for the contact object.

Alternatively, if social data for the contact object does exist, the contact object may be a previously contacted object. Accordingly, the pattern analyzing unit 114 may analyze a pattern of contact with the contact object using the data stored in the memory unit 140, and update the social data of the contact object to reflect the analyzed contact pattern.

In operation 320, the portable terminal 100 collects additional data for pattern analysis. In an example, additional data may include at least one of human body contact occurrence location information, human body contact occurrence time information, weather information, movement information after the human body contact, and human body contact occurrence area information.

In operation 322, the portable terminal 100 analyzes a pattern using at least one of stored social data, reference data, and the collected additional data.

In operation 324, the portable terminal 100 may provide a service corresponding to a pattern analysis result. In an example, pattern analyzing unit 114 may set a relationship mode of the contact object using at least one of the reference data, the user data, and additional collected data. Similarly, relationship level of the contact object may be set using at least one of a contact frequency, a contact time, and a contact area of the contact object. Based on the relationship mode and level, service executing unit 115 may execute a corresponding application.

Although not shown, operation 310 could include the step of determining whether the location of the human body contact coincides with the predetermined contact areas, which may be set by a user. If the location of the human body contact coincides with the predetermined contact areas, the portable terminal 100 could proceed to operation 314 without performing operation 312. If the location of the human body contact does not coincide with the predetermined contact areas, the portable terminal 100 could proceed to operation 312 as shown in FIG. 3.

Figure 4:
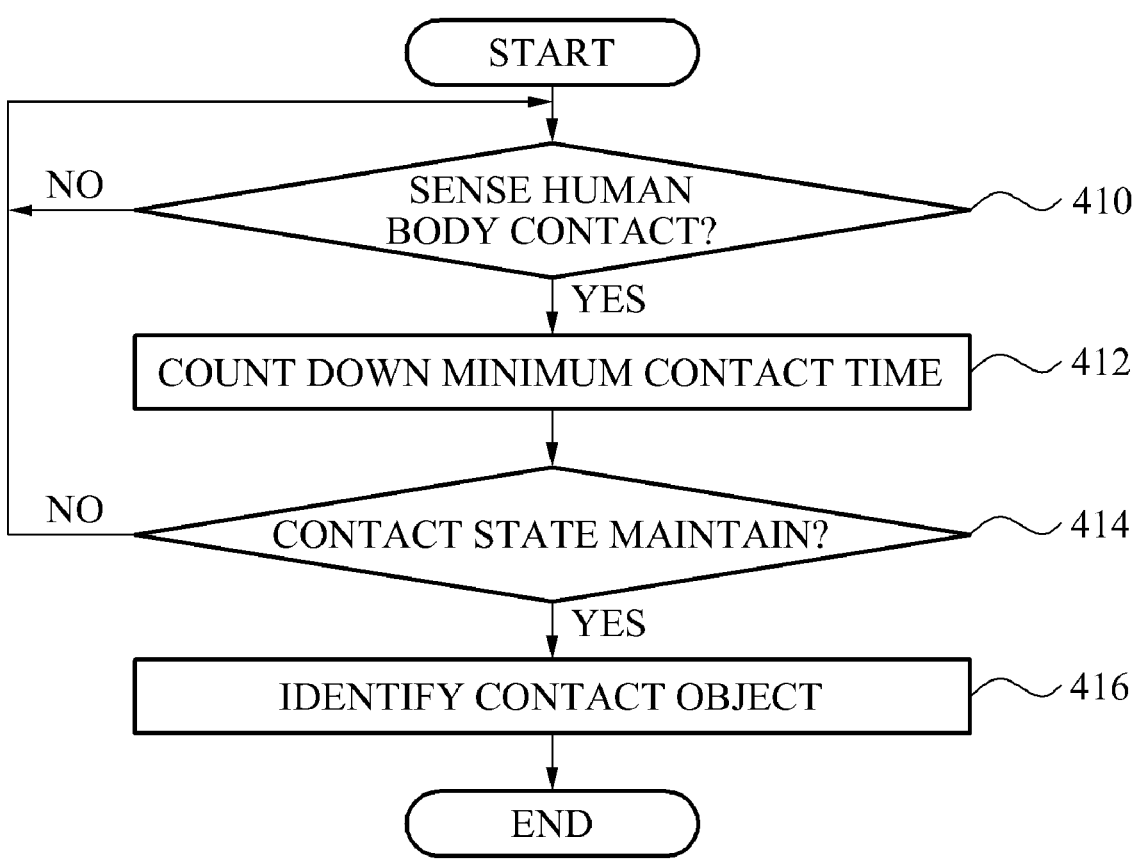
FIG. 4 is a flowchart illustrating a method for transmitting user identity information for a social network service by a portable terminal according to an exemplary embodiment of the invention.

FIG. 4 is a flowchart illustrating a method for transmitting user identity information for a social network service by a portable terminal according to an exemplary embodiment of the invention.

As shown in FIG. 4, if the portable terminal 100 senses a human body contact in operation 410, the portable terminal 100 may begin counting the time of contact to check whether the contact maintains for a minimum contact time, in operation 412. In an example, minimum contact time may be predetermined by the user, portable terminal, or by some other entity.

In operation 414, the portable terminal 100 may check whether the contact was maintained for the minimum contact time.

When the contact ends before the minimum contact time in operation 414, the portable terminal 100 may determine the contact as a meaningless contact and return to operation 410.

If the contact is maintained for the minimum contact time in operation 414, the portable terminal 100 determines the contact as a meaningful contact, and transmits identity information of the portable terminal 100 to a contact object using human body communication, in operation 416.

In addition, although not shown in the provided figures, the embodiments of present invention may be used in other circumstances as well. For example, if there are human body contacts with more than one person at a time, the information of one portable terminal may be shared with one or both of the other terminals as desired by the user. Alternatively, there may be executable programs which require at least two portable terminals to be present in the contact person for a particular piece of information to be shared with the third portable terminal. In another example, the person holding a portable terminal may share information with a computer or a network through a contact input.

The exemplary embodiments according to the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A portable terminal to provide social network service using human body communication comprising:
    a human body communication connection analyzing unit to sense a human body contact;
    a human body communication unit to transmit or receive data through a human body;
    a memory unit to store at least one of social data, user data, reference data, and additional data collected;
    a contact object identifying unit to identify a contact object by using the data received by the human body communication unit; and
    a pattern analyzing unit to analyze a pattern of contact with the contact object using the data stored in the memory unit.

2. The portable terminal of claim 1, wherein the user data comprises at least one of a telephone directory, message data, a picture, a moving image, and schedule information of a user.

3. The portable terminal of claim 1, wherein the social data comprises identity information and social network information, and further comprises at least one of a name, a password, and social relationship information.

4. The portable terminal of claim 3, wherein the social network information comprises at least one of a relationship mode indicating a relationship with the contact object, a relationship level indicating a level of the relationship with the contact object, a contact time indicating a retention time of contact with the contact object, and a contact frequency indicating a number of contact with the contact object over a period of time.

5. The portable terminal of claim 3, wherein the social relationship information comprises at least one of a relationship mode indicating a relationship between the contact object and the third party, a relationship level indicating a level of a relationship between the contact object and the third party, a contact time indicating a retention time of contact between the contact object and the third party, and a contact frequency indicating a number of contact between the contact object and the third party.

6. The portable terminal of claim 1, further comprising a data collecting unit to collect additional data to store in the memory unit.

7. The portable terminal of claim 6, wherein the additional data comprises at least one of human body contact occurrence location information, human body contact occurrence time information, weather information, movement information after the human body contact, and human body contact occurrence area information.

8. The portable terminal of claim 6, wherein the pattern analyzing unit sets a relationship mode of the contact object using at least one of the reference data, the user data and the additional data, and
    sets a relationship level using at least one of a contact frequency, a contact time, and a contact area of the contact object.

9. The portable terminal of claim 1, wherein if the contact object is a new contact object, the pattern analyzing unit analyzes a pattern of contact with the contact object using the data stored in the memory unit, determines a relationship mode and a relationship level of the contact object, and generates social data of the contact object.

10. The portable terminal of claim 1, wherein if the contact object is a previously stored contact object, the pattern analyzing unit analyzes a pattern of contact with the contact object using the data stored in the memory unit, and updates the social data of the contact object to reflect the analyzed contact pattern.

11. The portable terminal of claim 1, wherein a human body communication connection analyzing unit further senses the location of the human body contact and measures a duration of the human body contact.

12. The portable terminal of claim 11, wherein the human body communication connection analyzing unit determines the human body contact as a meaningful human body contact if the contact time is equal to or greater than a predetermined time or if an area of the human body contact is a predetermined area.

13. The portable terminal of claim 12, wherein the contact object identifying unit receives identity information of the contact object, if the human body contact is a meaningful human body contact.

14. The portable terminal of claim 1, further comprising:
    a service executing unit to execute an application corresponding to the contact pattern analyzed by the pattern analyzing unit.

15. The portable terminal of claim 14, wherein the application includes at least one of a business card exchange application for exchanging business information using the human body communication, a scheduling application for sharing a schedule or setting a task using the human body communication, an information sharing application for sharing information using the human body communication, a ticket transmitting application for transmitting or receiving a ticket using the human body communication, and an agent application for receiving authorization using the human body communication.

16. The portable terminal of claim 1, further comprising:
    a personal information transmitting unit to control the human body communication unit to transmit identity information of the portable terminal to the contact object, if the human body contact is a meaningful human body contact.

17. The portable terminal of claim 1, further comprising:
    a security processing unit to secure access to the stored social data using password authentication.

18. A method for providing social network service using a human body communication comprising:
    sensing a human body contact;
    transmitting or receiving data through a human body communication;
    storing at least one of social data, user data, reference data, and additional data collected;
    identifying a contact object using the data received via human body communication; and analyzing a pattern of contact with the contact object using the stored data.

19. The method of claim 18, further comprising determining whether the sensed human body contact is a meaningful contact, wherein meaningful contact is determined if when a duration of contact time is equal or greater than a predetermined time or when an area of the human body contact is a predetermined area.

20. The method of claim 19, further comprising:
transmitting identity information of a portable terminal to the contact object if the human body contact is a meaningful human body contact.

21. The method of claim 18, wherein the social data comprises identity information of a portable terminal's user and social network information, and further comprises at least one of a name, a password, and social relationship information.

22. The method of claim 21, wherein the social network information comprises at least one of a relationship mode indicating a relationship with the contact object, a relationship level indicating a level of the relationship with the contact object, a contact time indicating a retention time of contact with the contact object, and a contact frequency indicating a number of contact with the contact object over a period of time.

23. The method of claim 21, wherein the social relationship information
comprises at least one of a relationship mode indicating a relationship between the contact object and the third party, a relationship level indicating a level of a relationship between the contact object and the third party, a contact time indicating a retention time of contact between the contact object and the third party, and a contact frequency indicating a number of contact between the contact object and the third party.

24. The method of claim 18, further comprising:
collecting additional data to be store in the memory unit.

25. The method of claim 18, wherein if the contact object is a new contact object, a relationship mode and a relationship level of the contact object is determined by executing the analyzing a pattern of contact with the contact object step, and social data of the contact object is generated based on the relationship mode and relationship level.

26. The method of claim 18, wherein if the contact object is a previously stored contact object, social data of the contact object to reflect the analyzed contact pattern as determined by the analyzing a pattern of contact with the contact object step.

27. The method of claim 18, wherein identifying the contact object comprises receiving identity information of the contact object, if the human body contact is a meaningful human body contact.

28. The method of claim 18, further comprising:
executing an application corresponding to the analyzed contact pattern as determined by the analyzing a pattern of contact with the contact object step.

* * * * *